Oct. 5, 1937.  S. SEWALL  2,094,970
WINDSHIELD CONSTRUCTION
Filed June 25, 1936
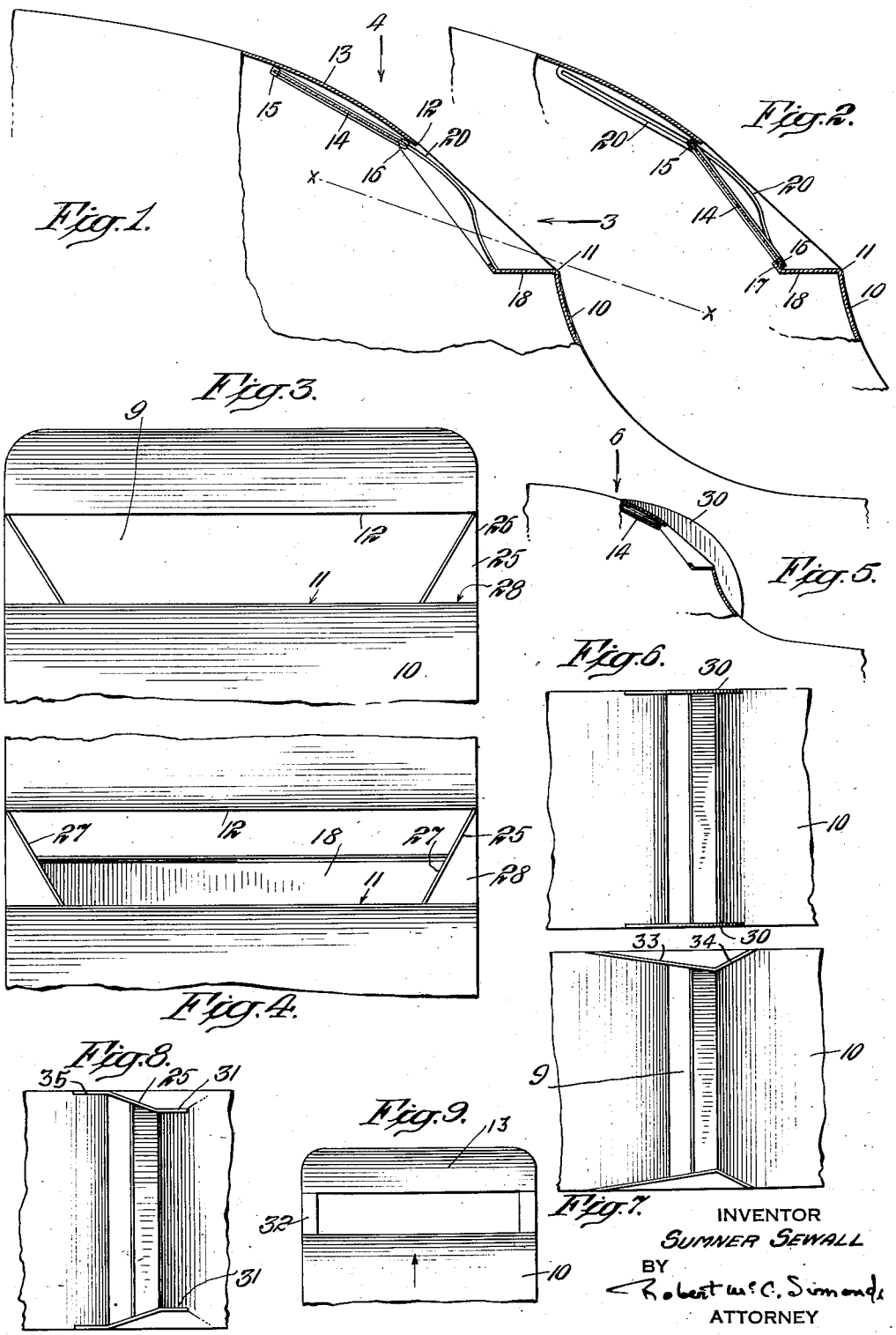
INVENTOR
SUMNER SEWALL
BY
Robert McC. Simonds
ATTORNEY Patented Oct. 5, 1937

2,094,970

UNITED STATES PATENT OFFICE 2,094,970

WINDSHIELD CONSTRUCTION

Sumner Sewall, Bath, Maine

Application June 25, 1936, Serial No. 87,132

10 Claims. (Cl. 296—91)

This invention relates to improvements in the type of construction set forth in my United States Letters Patent No. 2,012,591, in which, for example, a windshield in front of the operator of a vehicle is so constructed that there is a clear opening through which he may look, while air streams directed toward the opening are prevented from entering the body of the vehicle through the opening.

According to my said patent, there is provided a combination of surfaces, between which lies a clear opening, one of these surfaces being adapted to deflect an air stream, and thus build up a high pressure area, and the other of these surfaces being adapted to catch the air flowing from the first surface, and to develop a low pressure area, so that the air flows over the second surface instead of blowing in through the opening.

I have found that when the construction takes the form shown in my said patent, most winds are prevented from entering the body of the vehicle through said opening, but that side gusts or quartering winds occasionally break through, not with their full force, but enough to produce a noticeable stir of air in the vehicle.

According to the present invention, I have devised certain improvements in the aforesaid type of construction, which permit a large opening for weather conditions in which occasional entering air is unobjectionable or even desirable, which enable the effective size of the opening to be reduced to a point where the device is practically air-tight against entering drafts, even when flukey air is encountered, while at the same time a substantial, clear-vision opening is retained, and which enable the opening to be entirely closed in the event of heavy rain.

More specifically, the upper and lower surfaces are preferably mounted in fixed positions with their adjacent edges spaced so far apart that there is some tendency for air to break through the maximum opening thus obtained, and into the interior of the vehicle, and other means are provided for, in effect, moving the forward edge of the upper surface and the upper edge of the lower surface nearer together, in order to seal the opening against in-drafts as desired. This is accomplished to advantage by mounting a windshield member, which is preferably composed of transparent material, so that it can be moved or slid forwardly and downwardly, with its forward edge always maintained inwardly of the path of the air stream flowing from the lower surface to the upper surface. In other words, this member is mounted so that it moves to project the forward edge of the upper surface toward the upper edge of the lower surface, with the result that the effective size of the opening is reduced, and the construction is substantially sealed even against flukey air when the member is in partly closed position.

Furthermore, according to one preferred form of the invention, this same member is arranged so that upon continued forward and downward movement, it ultimately closes the opening entirely, as is desirable in the case of heavy rain, provision being made for supporting the transparent member, when in fully closed position, at an angle of less than 45° to the vertical.

Another feature of the invention lies in the provision of a particular arrangement of solid members along the sides of the opening, to assist in preventing side gusts or quartering winds from breaking in through the opening.

Other features, objects and advantages of the invention will become apparent in connection with the following detailed description of certain forms of construction illustrating the invention, reference being had to the accompanying drawing wherein:

Fig. 1 is a side elevation, partly broken away and partly in section, showing one form of construction according to the invention;

Fig. 2 is a view similar to Fig. 1, but showing the transparent closure member in fully closed position;

Fig. 3 is a front elevation of the construction shown in Fig. 1, looking in the direction of the arrow 3;

Fig. 4 is a plan view of the construction shown in Fig. 3, looking in the direction of the arrow 4 (Fig. 1);

Fig. 5 is a side elevation, partly in section, showing a somewhat modified form of construction, also in accordance with the invention;

Fig. 6 is a plan view of the construction shown in Fig. 5, looking in the direction of the arrow 6;

Figs. 7 and 8 are plan views showing modifications of the construction illustrated in Figs. 5 and 6; and Fig. 9 is a front elevation of a modification of construction shown in Figs. 1 to 4.

Referring first to Figs. 1 and 4, the construction illustrated includes a lower surface 10 which is constructed and arranged to sweep air, flowing toward the front of a vehicle, into a path where it blows generally across an opening 9 between the upper edge 11 of surface 10, and the forward edge 12 of an upper surface 13. The upper surface 13 is preferably constructed and arranged so that it takes generally the contour of the upper surface of a cambered airplane wing. Both the upper and lower surfaces are constructed in accordance with the principles set forth in my said patent.

The present construction includes a member 14, which may consist of a flat sheet of glass, of such extent that its rear or upper edge 15 is adapted to lie in back of the forward edge 12 of the upper surface or roof of the car or vehicle, when its lower or front edge 16 closes (as in Fig. 2) against a suitable flange 17 secured to a rigid shelf 18, which preferably extends rearwardly from adjacent the upper edge 11 of the lower surface 10 in cases where the edge 12, as is desirable, lies well rearward of the edge 11. The member 14 may carry, in any convenient manner, rollers (not shown) which are adapted to ride in tracks 20 secured to the body of the vehicle.

The tracks 20 may be formed with suitable curved portions below and forward of the fixed edge 12, so that the member 14 can slide forwardly and downwardly, with the purpose of bringing the edge 16, during the initial portion of its movement, along a path such that the member 14 constitutes in effect an extension of the surface 13. That is to say, the path of the tracks 20 is preferably such that the member 14 will assume partly or semi-closed positions where its forward edge 16 lies inwardly of the air stream flowing from the surface 10 to the surface 11, so that the member 14 does not catch the air and deflect it into the body of the car. In this position, the portion of the member 14 which extends out below the edge 12, constitutes substantially a continuation of the surface 13. It will be appreciated that the member 14 may be made curved, if desired, for the purpose mentioned, although I have found that highly satisfactory results are obtainable with a flat plate 14. Latches (not shown) may be used to hold member 14 in any desired position.

I prefer to arrange the tracks 20, so that the member 14 can be partly closed to a position where its lower edge 16 lies about one-third of the distance between the edge 12 of the upper surface and the edge 11 of the lower surface, with the member 13 extending as nearly as possible as a projection of the smooth curve of the upper surface, and preferably well inside the line 11—12 (Fig. 1). I have found that when the member 14 occupies such a position, even occasional indrafts are eliminated and that a comparatively strong out-draft is obtained. By means of the shelf 18, the member 14 is enabled to lie at an angle of less than 45° to the vertical, as it is important to reduce distortion, when the member 14 is fully closed. It will be understood that the rollers which are carried by the closure member 14 may be mounted either adjacent the ends of this member, or somewhat in from the ends, in order that this member may move in the desired path, as mentioned.

Referring now more particularly to Figs. 3 and 4, the construction preferably includes side closure members 25, which may be generally triangular in shape, and which instead of extending parallel to the sides of the vehicle between the upper and lower surfaces, are inclined inwardly and forwardly, substantially as shown, to join the side walls of the vehicle as at 26, and to join the shelf 18 as indicated at 27. To complete the closing in of the body at the outside of members 25, solid, generally horizontal members 28 may be employed to join the lower edges of members 25, the upper edge 11 of the lower surface, and the sides of the body, as best shown in Fig. 4. Members 25 may be made of glass to increase visibility. If desired, members 25 and 28 may be flared into each other, instead of being flat and meeting at a sharp angle. The members 25 may meet the edge 12 of the upper surface adjacent the ends of this edge, or substantially inward thereof.

I have found that when the members 25 are arranged in this fashion, the tendency of side drafts or quartering winds to break into the opening is substantially reduced. While the angle or inclination of the members 25, inwardly toward the front of the vehicle, may vary considerably, a good angle is about 40° to the length of the vehicle. When the member 14 is mounted as described, its side edges will lie in back of members 25, when member 14 is in closed or semi-closed position. The parts may be designed so that member 14 extends substantially the full width between the upper corners of side pieces 25, the tracks 20 and these side pieces being proportioned so that member 14 does not bind against the latter. Suitable packing may be provided, wherever required, to produce a tight fit around the edges of member 14 when it is in fully-closed position.

Although the front, downwardly inclined edges of the members 25 preferably lie substantially in straight lines between the edges 11 and 12 of the lower and upper surfaces, respectively, it is also possible to project the side members forwardly, as well as along portions of the upper and lower surfaces, for instance, as illustrated at 30 in Figs. 5, 6, and 7. In Fig. 6, the extensions 30 lie parallel to the sides of the car, which in this case replace inwardly inclined members 25. In Fig. 7, however, portions 33 of the extensions are inclined the same as members 25, while portions 35 are oppositely inclined, to produce a Venturi effect or channel for the air flowing across the opening 9. As shown in Fig 8, the side members 25 may take the configuration shown in Figs. 1 to 4, and parallel channel-forming extensions 35 and 31 may be provided on the upper and lower surfaces, similar to extensions 30 (Fig. 5), with or without their central portions.

In the form shown in Fig. 9, glass panels 32 of substantial width are provided for closing the ends of the opening. These panels extend from the edge 11 to the edge 12, either in a straight line, or in a continuation of the general curve of the upper surface 13, and their outside edges join the side walls of the vehicle body, to assist in preventing wind from breaking into the opening.

As indicated, particularly in connection with the forms shown in Figs. 1 to 4 and Fig. 9, it is preferable to restrict the width of the opening (or the lower portion thereof) to substantially less than the width of the lower surface (or of both the upper and lower surfaces). While the flow of air is difficult to analyze, and while I do not wish to be bound by theory, I believe that the improved results obtained, especially with the first form of construction, are partly due to the manner in which the marginal solid members restrict the effective width of the opening to that center portion of the air stream which is least affected by side gusts. The improved results may be partly due to the setting up of marginal air streams between the main, central portion of the air stream flowing from the lower surface to the upper surface, and the sides of the vehicle body, thus assisting in preventing side gusts or quartering winds from breaking in through the opening.

The present construction thus enables upper and lower airfoil surfaces to be rigidly constructed with their adjacent edges spaced apart to form an opening which affords maximum visibility and, when desired, some but not the full in-draft, and also provides a semi-closed opening with a strong out-draft, without sacrifice of good visibility along the line $x$—$x$. This out-draft, in addition to combatting in-drafts, affords good ventilation. Moreover, the construction enables the same member which partly closes the opening to entirely close the same in the event of heavy rain.

It may be noted that where reference is made to the edges of the upper and lower surfaces, this intends the effective edges, in accordance with the principles of my prior patent. While the invention is particularly adapted for windshields of automobiles, boats, and airplanes, its use is not restricted to vehicles.

Many advantages of the present construction will be apparent from the foregoing description. The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A windshield construction of the character described, including a fixed lower surface adapted to bend an air stream blowing toward it, into a path generally at right angles to the main body of said air stream, and a fixed upper surface having an edge spaced above the upper edge of the lower surface, said upper surface being adapted to catch air flowing from said lower surface and carry it along the top of the upper surface, a solid closure member mounted to lie normally beneath said upper surface, and means to enable said closure member to travel forwardly and downwardly to form, in partly closed position, a substantial continuation of said upper surface with the forward edge of said member out of the air stream flowing from said lower to said upper surface.

2. The construction as claimed in claim 1, wherein a fixed shelf extends rearwardly from adjacent the upper edge of the lower surface, said shelf being constructed, and arranged to engage the lower edge of said member.

3. A windshield construction of the character described, including a lower surface adapted to bend an air stream, an upper surface having an edge spaced above and rearwardly of the upper edge of the lower surface, and sufficiently close to the latter to catch most of the air flowing past said upper edge, means to restrict the width of at least a portion of the opening between said surfaces to less than the full width of the lower surface, and means adapted to extend from one of said edges for partially closing said opening.

4. The construction as claimed in claim 3, wherein the first-named means comprise members at the sides of the opening extending inwardly and forwardly from the forward edge of the upper surface to the upper edge of the lower surface, said members being constructed and arranged to close in the sides of the opening.

5. In a vehicle body, including a lower surface adapted to deflect an air stream, and an upper surface having an edge spaced from the upper edge of said lower surface, and being adapted to develop a negative pressure adjacent its forward edge and to catch air flowing from the first-named surface, inclined closure members at the sides of the opening between said surfaces, said members extending inwardly and forwardly, and joining the edges of said surfaces and the walls of the vehicle body, to substantially close in the sides of the opening, and means to partially close said opening between said edges.

6. The construction as claimed in claim 1, wherein said means includes a movable member, and tracks adapted to guide said member to a partially closed position where said member constitutes a continuation of the upper surface, and to a fully closed position where said member lies at an angle of less than 45° to the vertical.

7. In a windshield construction of the character described, including a lower surface adapted to deflect an air stream, and an upper surface having the forward edge spaced from the upper edge of the lower surface and being adapted to carry the air stream flowing from the lower surface, over the top of the upper surface, a solid transparent member adapted to lie normally beneath said upper surface and rearward of the forward edge of said surface, and to travel forwardly and downwardly to form a substantial extension of said upper surface and thus partially close said opening in one position, said member being adapted to completely close said opening in another position.

8. The construction as claimed in claim 1, wherein the portions of the opening between said upper and lower surfaces, adjacent the side edges thereof, are closed by solid portions extending from the upper edge of the lower surface to the forward edge of the upper surface, whereby the width of said opening is less than the full width of said surfaces.

9. In a windshield construction, including a lower surface adapted to bend an air stream flowing toward it, and an upper surface having a forward edge mounted above and rearwardly of the upper edge of the lower surface and being adapted to catch most of the air flowing from the lower surface to the upper surface, a shelf extending generally longitudinally rearward from the lower surface at or below the level of the effective upper edge thereof, a solid, transparent member extending in its closed position from inside the forward edge of the upper surface to meet said shelf at a line rearward of the upper edge of the lower surface, and means to mount said member to move upwardly into a position beneath the top of the vehicle, the lower edge of said member in any intermediate position thereof being at all times within an imaginary plane joining the upper edge of the lower surface and front edge of the upper surface.

10. The construction as claimed in claim 1, wherein said closure member is a transparent member constructed and arranged to partially close said opening in one position and fully close said opening in another position.

SUMNER SEWALL.